United States Patent [19]

Hill

[11] 3,804,675

[45] Apr. 16, 1974

[54] METHOD OF MAKING AN ORGANIC CHARGE TRANSFER COMPLEX CATHODE

[75] Inventor: Kenneth R. Hill, Severna, Md.

[73] Assignee: P. R. Mallory & Co., Inc., Indianapolis, Ind.

[22] Filed: Oct. 12, 1971

[21] Appl. No.: 189,473

Related U.S. Application Data

[62] Division of Ser. No. 823,182, May 8, 1969, Pat. No. 3,653,966.

[52] U.S. Cl. ................................................ 136/137
[51] Int. Cl. ......................................... H01m 15/06
[58] Field of Search ............... 136/120 R, 137, 153; 252/62.3 Q; 260/397

[56] References Cited
UNITED STATES PATENTS

| | | | |
|---|---|---|---|
| 3,185,590 | 5/1965 | Mayer et al | 136/153 X |
| 3,379,742 | 4/1968 | Matsunaga | 260/396 |
| 3,468,716 | 9/1969 | Eisenberg | 136/155 X |

OTHER PUBLICATIONS

Labes et al., J. Chem. Physics Vol. 32, No. 5 pp. 1570–1572, 1959.

*Primary Examiner*—L. Dewayne Rutledge
*Assistant Examiner*—M. J. Andrews
*Attorney, Agent, or Firm*—Robert Levine

[57] ABSTRACT

A high energy cell employing a light metal anode and a cathode, the active material of which is a semiconductive organic charge transfer complex. In assembly of the cell direct contact of the anode and cathode promotes formation in situ on the anode of a high resistance ionically conductive film which functions as a self-adjusting cell separator. Other features of the invention appear in the specification.

5 Claims, No Drawings

METHOD OF MAKING AN ORGANIC CHARGE TRANSFER COMPLEX CATHODE

This is a divisional application of U.S. Ser. No. 823,182 filed May 8, 1969 now matured into U.S. Pat. No. 3,653,966.

This invention relates to high energy cells, and in particular to cells having a cathode whose active material is an organic charge transfer complex and having a self-adjusting cell separator formed by electrochemical reaction of the active cathode material and the cell anode.

Present high energy cells employing anodes of light metals such as lithium, organic electrolytes and cathodes whose active material is sulfur or transition metal halides require cell separator means interposed between the cell cathode and the electrolyte members to reduce free electrolyte flow to a negligible rate and thereby provide nominally requisite cell internal resistance.

In these types of cells there has been observed a detrimental cathodic production of cell anions capable of migration in the electrolyte. The sulfur cathode while itself insoluble in the organic electrolyte, gives rise to the formation of soluble discharge products, particularly the polysulfides, $S_x^{2-}$ ($x = 2$ to $9$). In the case of the transition metal halide cathodes such as, for example, cupric chloride, the cathode is itself insoluble in the cell organic electrolyte but forms the highly soluble chlorocuprate complexes $CuCl_2^-$, $CuCl_3^-$.

Such anions tend to migrate to the cell anode and cells of these types thus experience a substantial measure of self-discharge since microporous separator means of glass filter paper, nylon and the like are not effective to discriminate against required and undesirable ion migration. Migration of the anode cation to the cathode is, of course, essential to cell performance, whereas migration of anions derived from the active cathode material is undesirable and promotes said self-discharge. Since self-discharge occurs without loading, shelf life of cells of these types is limited.

A further shortcoming of present organic electrolyte cells and of all cells employing like chemically inert separator means is the possibility of cell failure due to separator breakdown. Where pinholes or other imperfections occur in the conventional microporous separators above described, there results an increase in electrolyte flow and a concomitant decrease in cell internal resistance which ultimately leads to anode-cathode short circuiting and cell failure.

It is an object of this invention to provide a high energy density organic electrolyte cell of extended shelf life.

It is a further object of the invention to extend shelf life and operating life of an organic electrolyte cell by providing a cell active cathode material which is not self-discharging.

It is an additional object of the invention to provide an organic electrolyte cell which may be assembled without inert microporous separator means interposed between the cell electrodes.

It is a further object of the invention to provide a chemically active, self-adjusting separator for electric cells.

In the present invention applicant has attained these objectives by developing a high energy organic electrolyte cell comprised of a light metal anode and a cathode, the active material of which is an organic charge transfer complex. The complex is essentially insoluble in the cell organic electrolyte and does not generate soluble discharge products. The cell is substantially non-self-discharging and has extended shelf life.

There has been developed further in the present invention a cell which is assembled without the physical placement of a separator element between the cell cathode and anode member. In assembly of the cell of the invention, an anode of a light metal such as lithium is placed in direct contact with a cathode formed of an active material consisting of an organic charge transfer complex, therebeing formed in situ on the anode by electrochemical reaction between the anode and active cathode material an ionically conductive high resistance film comprised of a compound of the anode and active cathode materials and capable of functioning as the cell separator. The separator is chemically active and self-adjusting, the reaction forming the separator recurring upon re-exposure of the anode surface to provide the cell with requisite internal resistance at all times.

The cathode of cells constructed in accordance with the invention is constituted by a complexation product, the constituents of which are an organic donor and an organic acceptor. While the complex is preferably admixed with both particulate electrically conductive material and an electrolyte in the form of an organic solvent containing a metallic salt, the complex may be employed without such additives depending upon the relative proportions of organic acceptor and donor therein.

The foregoing and other objects and features of the invention will be evident from the following detailed description thereof.

The present invention is not directed to any particularly detailed cell structure, but rather to the electrochemical cell constituents. In terms of physical arrangement of the cell components, it is only required that the anode and cathode members be placed in direct physical contact during cell assembly. If the cell includes an electrolyte or particulate conductive cathode material, same is contained by the cell cathode. It is also required that the cell be sealed to prevent atmospheric contamination of the constituents, which shall be discussed presently.

The active cathode material of cells of the invention comprises an organic charge transfer complex consisting of an organic acceptor and an organic donor. Acceptors include halogenides such as chloranil, bromanil or iodanil. Suitable donors may comprise p-phenylene diamine, 3,8-diamino pyrene, dimethyl aniline, tetramethyl-p-phenylene diamine, or 3,10-diamino pyrene. While various combinations of acceptor and donor are usable, a particularly preferred active cathode material is the complexation product comprising chloranil plus p-phenylene diamine:

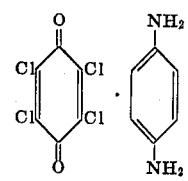

A preferred ratio for this complexation product is 3:2. While the halogenide is soluble in organic solvents, the complexation product is essentially insoluble in organic solvents.

The charge transfer complex may be prepared by any suitable method for the preparation of organic semiconductors. Exemplary methods employed in the formation of the active cathode material of practical cells are as follows, method (B) involving the preferred ratio of components.

Method (A). Five parts chloranil and three parts p-phenylene diamine are dissolved separately in a heated organic solvent such as propylene carbonate, gamma-butyrolactone or methyl formate. The chloranil requires about 40 mls. solvent per gram and heating to about 80° C with stirring. The p-phenylene diamine requires about 10 mls. solvent per gram. When most of the chloranil is dissolved, the temperature of the two solutions are equalized. The solutions are then mixed and stirred until cool. The greenish-black complex thus formed is filtered with suction, washed on the filter with cold absolute ethanol and air dried or dried by evaporation of the solvent.

Method (B). Method (A) is practiced using two parts chloranil and three parts p-phenylene diamine. The resulting air dried greenish-black filter cake is then redispersed in a small amount of cold ethanol, refiltered and vacuum dried or dried by evaporation of the solvent.

Method (C). In this process, method (B) is practiced using equal parts of chloranil and p-phenylene diamine.

A charge transfer complex prepared by any of these methods may either be employed alone as the cell cathode or it may be admixed with electrically conductive particulate matter which is chemically inert. For example, graphite may comprise 5% of the cathode by weight.

Prior to the final step of the above methods wherein the complex is dried in air, by vacuum or dried by evaporation of the solvent, the cell electrolyte is preferably admixed with the complex to form a composite cathode-electrolyte or catholyte. For example, the complex may be thoroughly mixed in a mortar with a 0.1 to 1.0 molar lithium fluoroboratepropylene carbonate solution. The resulting black powder has a dry appearance but flows plastically under pressure. Lithium perchlorate or lithium tetrachloroaluminate may be used in place of lithium fluoroborate as the electrolyte salt. Such admixture and intimate contact between complex and electrolyte is of course permissible by reason of the insolubility of the complex in the electrolyte. As will be shown hereinafter in the examples, method (a) cathodes containing excess halogenides may be used without the addition of either conductive matter or electrolyte.

The organic solvent is required to be compatible with the cell anode, i.e. the solvent must not be significantly reactive with the light metals. We have found propylene carbonate, gamma-butyrolactone and methyl formate to be particularly preferred cell solvents.

In constructing practical cells in accordance with the invention, the cathode or cathode-electrolyte mix may be pressed directly into a suitable cell can. In this case, the ethanol slurry or paste constituting the mix is air dried or vacuum dried prior to pressing. Alternatively, the paste may be rubbed onto a hot plate or heated cell container and the solvent removed by evaporation.

Cell assembly is completed by placing an anode member comprised of a light metal such as lithium upon and in direct contact with the cathode or cathode-electrolyte mix in the cell container and sealing same from atmospheric reactants.

The electrochemical reaction occurring in a cell comprising the chloranil/p-phenylene diamine complex and a lithium anode is presumed to be:

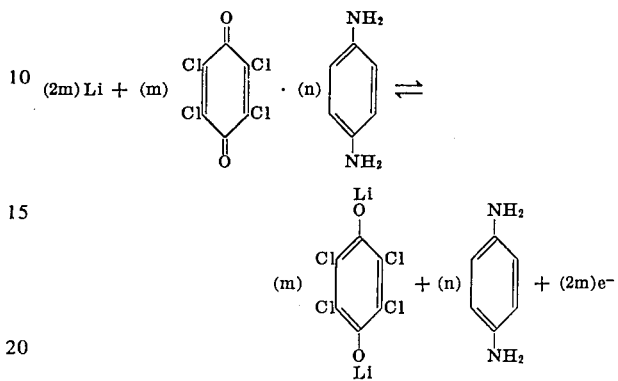

In this reaction it will be observed that lithium is effective to dissociate the cathodic complex liberating 2m electrons and reacting with chloranil to form the salt $Li_2O_2C_6Cl_4$. Formation of the lithium chloranil salt on the anode at the anode-cathode interface is, in effect, the in situ formation of a chemically active cell separator constituting a compound of the anode and active cathode material. The thin film of this salt is present instantaneously upon cell assembly and by reformation throughout cell life.

The in situ separator is ionically conductive, permitting migration of lithium ions to the cell cathode and at the same time prevents short-circuiting of the cell by maintaining an electronic barrier between anode and cathode. By the film reformation capabilities of the cell components, the film is self-adjusting, healing imperfections as they occur, i.e. as the lithium anode becomes exposed or unfilmed. This separator characteristic is in direct contrast to that of the chemically inert cell separator which, upon the occurrence of pinhole failures or like imperfections, gives rise to internal shorting and cell failure.

The following examples are illustrative of practical cells made in accordance with the invention and the operating characteristics thereof.

EXAMPLE I

A method (A) cathode was made using 0.0552 gm. of active material admixed with 5% graphite. This mixture, absent any electrolyte, was air dried and pressed into a pellet at 5,000 lbs/in² and inserted in a cell can. An anode of lithium was placed upon the pellet and the cell was sealed. An open circuit voltage measurement of 3.25 volts was obtained. The cell was then discharged through a 330,000 ohm resistor until its output voltage dropped to 1.0 volts, discharge extending over a 140 hour period.

EXAMPLE II

A method (A) cathode was made using 0.0963 gm. of active cathode material. The material was air dried without the addition of conductive particulate matter or electrolyte and pressed into a pellet at 3,000 lbs/in². The pellet was inserted into a cell can and an anode of lithium placed thereupon. Upon sealing of the can an open circuit voltage of 3.20 volts was obtained. The cell was discharged through a 330,000 ohm resistor until its output voltage dropped to 1.0 volts, discharge extending over a 164 hour period.

EXAMPLE III

A method (A) cathode was made using 0.0115 gm. of active material. The material was employed without the addition of conductive particulate matter or electrolyte. Instead of air drying the ethanol slurry of active cathode material, the material was deposited as a slurry and the solvent removed by evaporation. A lithium anode was placed upon the deposit and the cell sealed. An open circuit voltage of 3.17 volts was obtained. Discharge into a 270,000 ohm resistive load extended over a 38 hour period before cell output voltage dropped to 1.0 volts.

EXAMPLE IV

A method (A) cathode was made using 0.0703 gm. of active material which was air dried and admixed with 5 percent by weight of a 0.1 molar solution of lithium perchlorate in propylene carbonate. The mixture was pressed into a pellet by hand and inserted into a cell can. A lithium anode was placed thereupon and the cell sealed. An open circuit voltage of 3.26 volts was obtained. Discharge to a cell voltage of 1.0 volts using a 270,000 ohm resistive load extended over 137 hours.

EXAMPLE V

A method (B) cathode was made using 0.0550 gm. of active material admixed after vacuum filtering with 41 percent by weight of a 1.0 molar solution of lithium tetrafluoroborate in propylene carbonate. The mixture was hand pressed into a pellet and inserted into a cell can. A lithium anode was placed thereupon and the cell sealed. An open circuit voltage of 2.98 was obtained. Discharge of the cell into a 270,000 ohm resistive load until cell voltage dropped to 1.0 volts extended over a 108 hour period.

EXAMPLE VI

A method (B) cathode was made using 0.016 gm. of active material admixed with 41 percent by weight of a 1.0 molar solution of lithium tetrafluoroborate in propylene carbonate. The active cathode material was not vacuum filtered in this instance but was employed in its ethanol slurry state to form the mixture. The ethanol slurry mixture was rubbed on a hot substrate and dried by evaporation. A lithium anode was placed upon the deposit and the cell sealed. An open circuit voltage of 3.05 was measured. Discharge of the cell into a 270,000 ohm resistive load until cell output voltage dropped to 1.0 volts extended over a 74 hour period.

EXAMPLE VII

A cell was made as in Example VI using 0.0042 gm. of active material. Open circuit voltage was 3.18 volts and the discharge period was 18 hours.

EXAMPLE VIII

A cathode was made by method (C) above, using 0.0074 gm. of active material admixed, after vacuum filtration, with 41 percent by weight of a 1.0 molar solution of lithium tetrafluoroborate in propylene carbonate. The material was hand pressed into a pellet and inserted into a cell can. A lithium anode was placed upon the cathode and the cell sealed. The cell provided an open circuit voltage of 3.14 volts. Discharge of the cell into a 270,000 ohm resistive load until the cell output voltage decreased to 1.0 volts extended over a period of 37 hours.

From the foregoing examples, it will be evident that cells employing a cathode comprised of the active material complex consisting of 2 parts chloranil and 3 parts p-phenylene diamine gives superior performance, providing utilization efficiencies in excess of twenty percent of the theoretical cell efficiency. The theoretical energy density of the cell of the invention has been calculated to be 173 watt hours per pound.

The examples also illustrate that improved performance in cells of the invention may be expected where the active cathode material was applied to the substrate and the solvent removed by evaporation and where an electrolyte solution is employed in the cathode mix.

It is shown further, in Examples I, II and III, that the organic charge transfer complex prepared with excess donor material may be employed without adding thereto an electrolyte. In these cases, it is presumed that there is present some of the organic solvent employed in the preparation of the active cathode material and that the lithium anode forms salts therein providing cations rendering the cell ionically conductive to support ionic conduction in the cells.

What is claimed is:

1. A method for preparing active cathode material for use in electric cells comprising the steps of:
  a. dissolving in an organic solvent selected from the group consisting of propylene carbonate, gamma-butyrolactone, and methyl formate, a halogenide selected from the group consisting of chloranil, bromanil and iodanil;
  b. dissolving separately in said organic solvent a compound selected from the group consisting of p-phenylene diamine, 3,8-diamino pyrene, dimethyl aniline, tetramethyl-p-phenylene diamine and 3,10-diaminopyrene;
  c. admixing said solutions to form a complexation product, said complexation product constituting said active cathode material.

2. A method for preparing a composite cathode and electrolyte for use in organic electrolyte cells comprising the steps of:
  a. dissolving in an organic solvent selected from the group consisting of propylene carbonate, gamma-butyrolactone and methyl formate, a halogenide selected from the group consisting of chloranil, bromanil and iodanil;
  b. dissolving separately in said organic solvent a compound selected from the group consisting of p-phenylene diamine, 3,8-diamino pyrene, dimethyl aniline, tetramethyl-p-phenylene diamine and 3,10-diaminopyrene;
  c. admixing said solutions to form a complexation product;
  d. admixing said complexation product with an electrolyte comprising said organic solvent and a light metal salt selected from the group consisting of light metal perchlorates, tetrachloroaluminates and tetrafluoroborates.

3. The method for preparing a composite cathode and electrolyte as claimed in claim 2 wherein the product of step (d) is deposited onto a substrate and the solvent is removed by evaporation.

4. The method for preparing a composite cathode and electrolyte as claimed in claim 2 wherein the product of step (d) is air dried and pressed into a pellet.

5. The method for preparing a composite cathode and electrolyte as claimed in claim 2 wherein the product of step (d) is vacuum dried and pressed into a pellet.

* * * * *